W. A. PENDRY.
APPARATUS FOR RETARDING THE RELEASE OF ENGINE BRAKES.
APPLICATION FILED SEPT. 7, 1909.
1,006,497.
Patented Oct. 24, 1911.
5 SHEETS—SHEET 1.
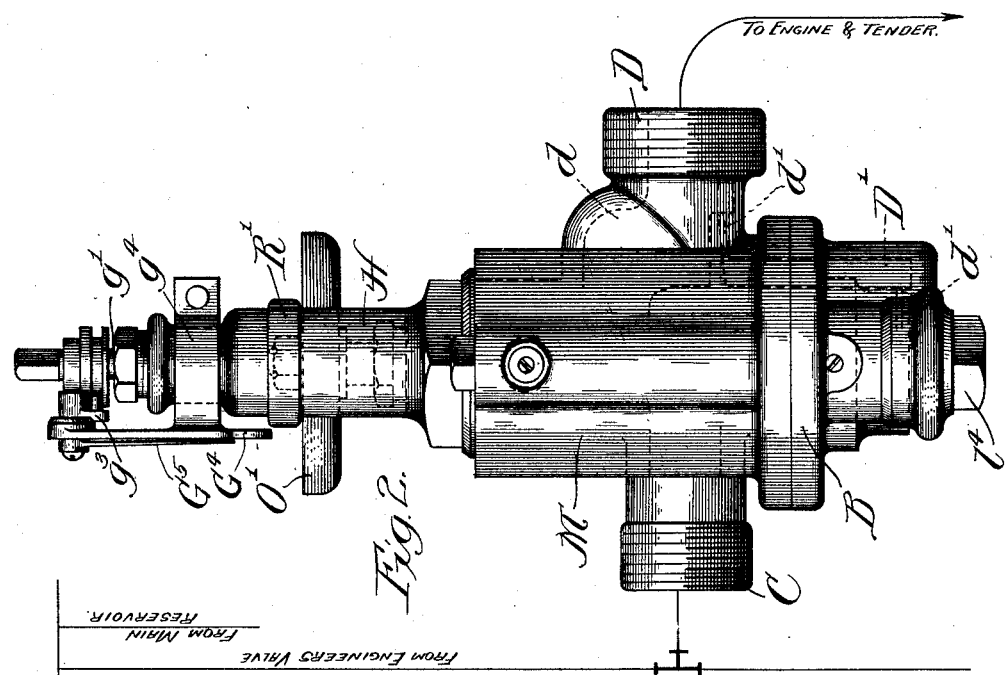
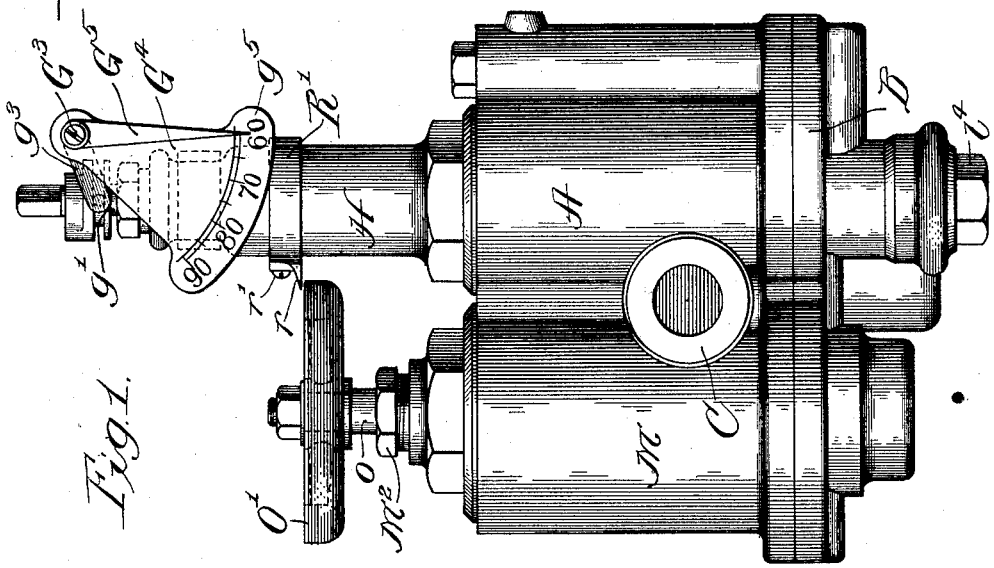
Witnesses:
John Enders
Chas. H. Buell.
Inventor:
William A. Pendry.
By Sheridan, Wilkinson & Scott,
Attys.

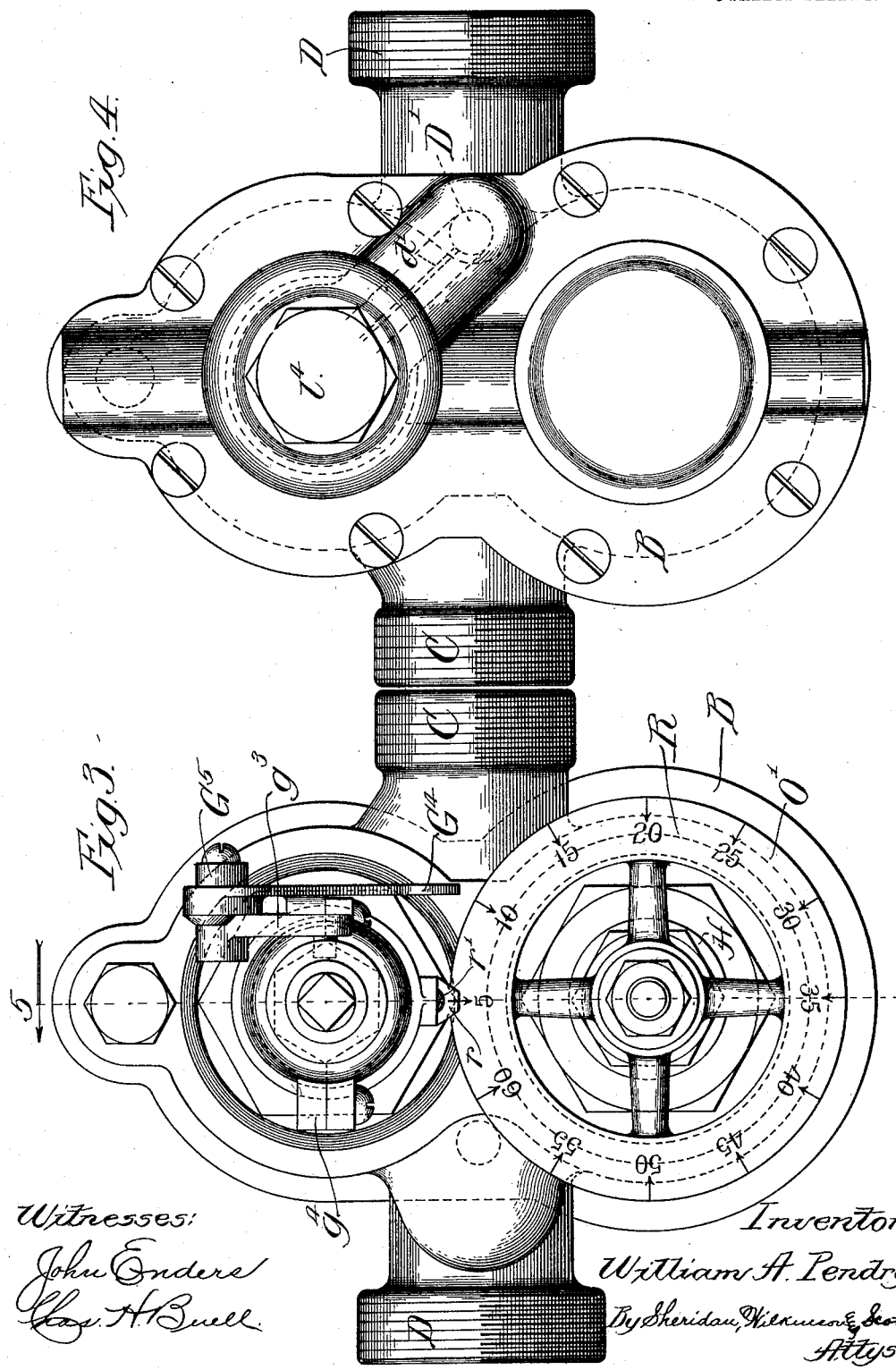

W. A. PENDRY.
APPARATUS FOR RETARDING THE RELEASE OF ENGINE BRAKES.
APPLICATION FILED SEPT. 7, 1909.
1,006,497.
Patented Oct. 24, 1911.
5 SHEETS—SHEET 3.
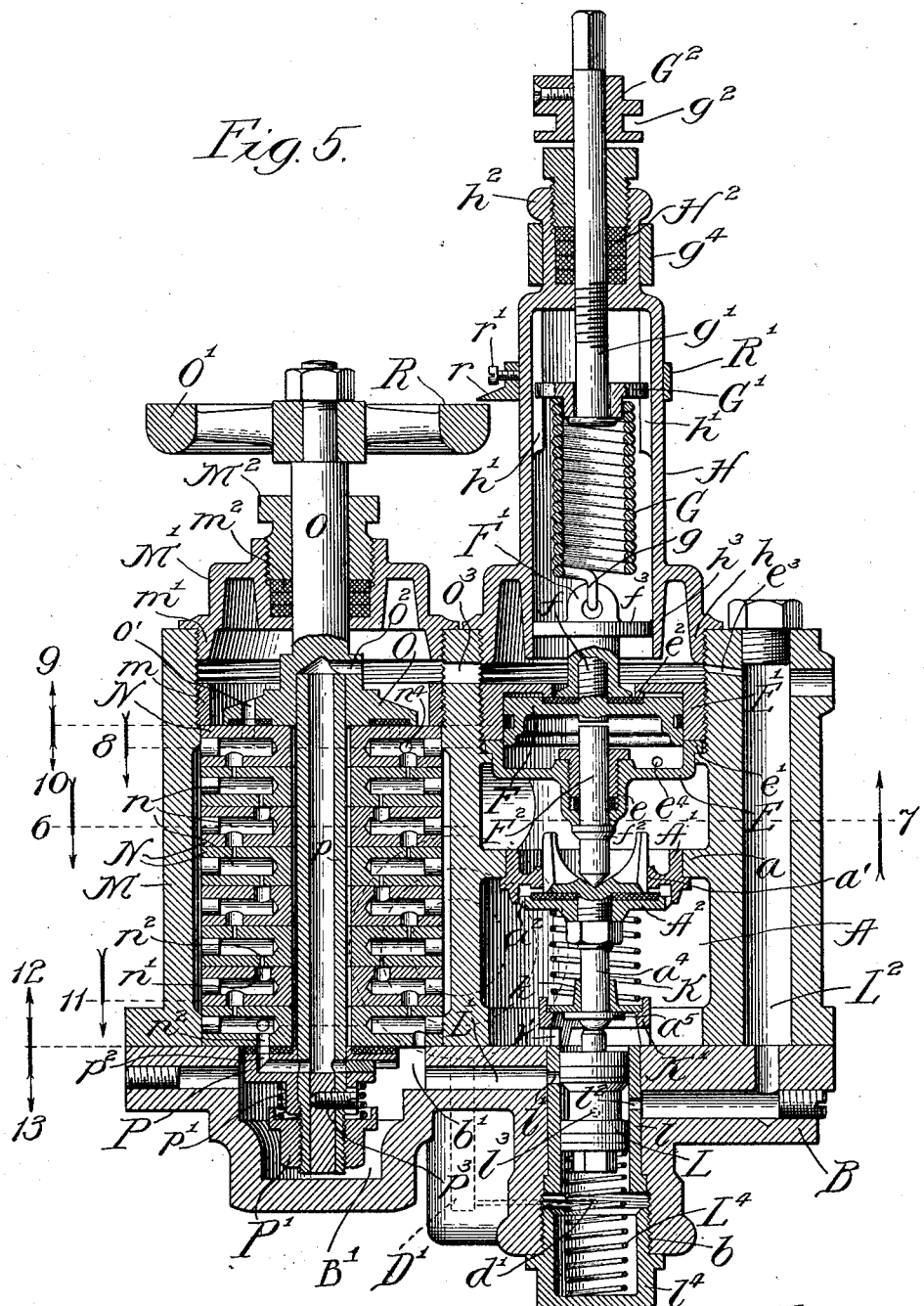

W. A. PENDRY.
APPARATUS FOR RETARDING THE RELEASE OF ENGINE BRAKES.
APPLICATION FILED SEPT. 7, 1909.
1,006,497.
Patented Oct. 24, 1911.
5 SHEETS—SHEET 4.
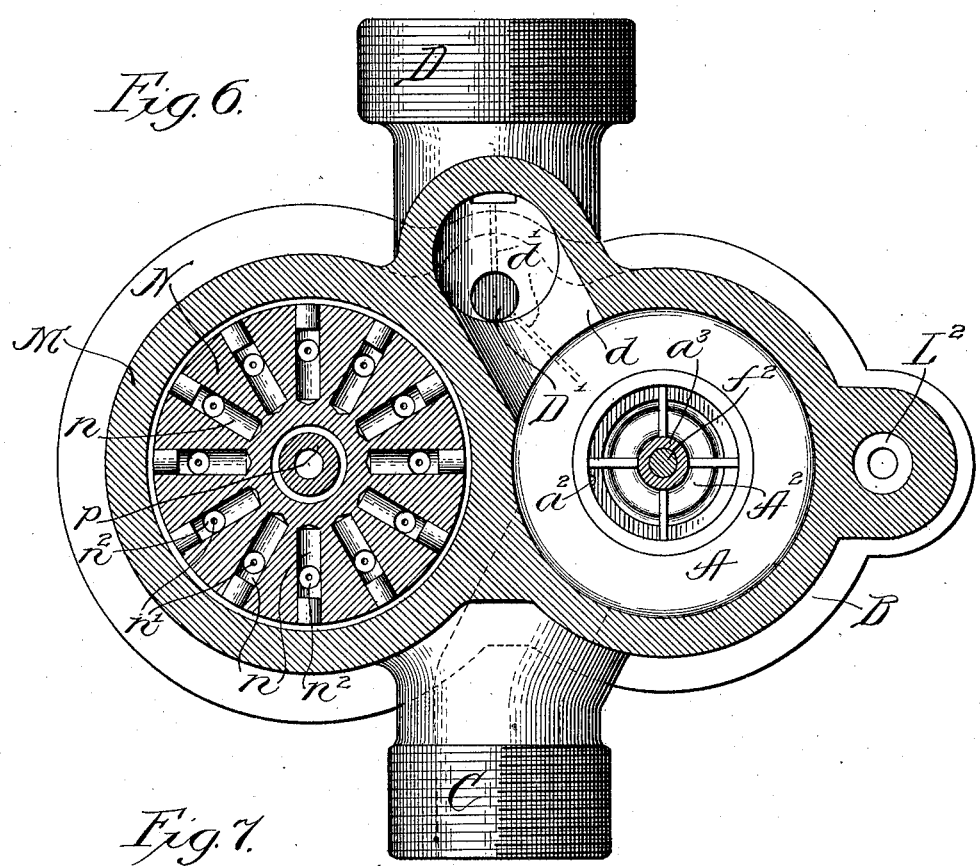
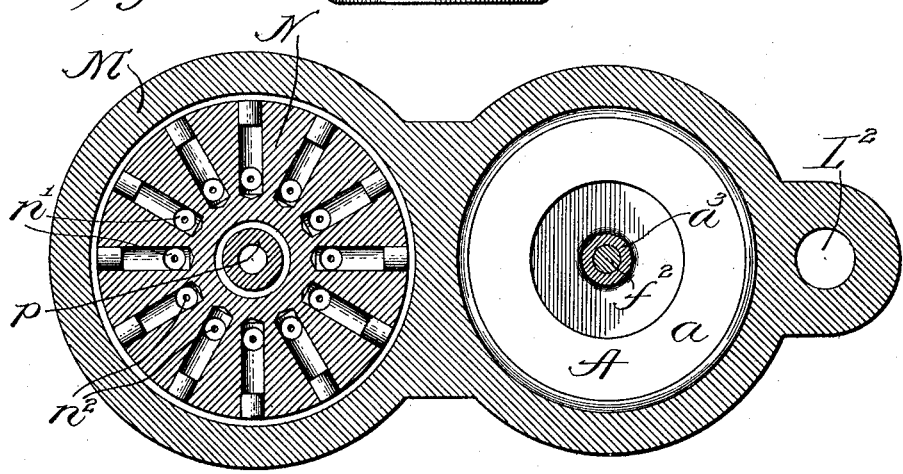

W. A. PENDRY.
APPARATUS FOR RETARDING THE RELEASE OF ENGINE BRAKES.
APPLICATION FILED SEPT. 7, 1909.
1,006,497.
Patented Oct. 24, 1911.
5 SHEETS—SHEET 5.
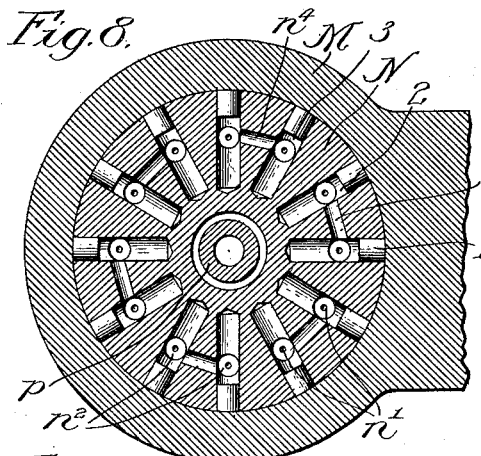
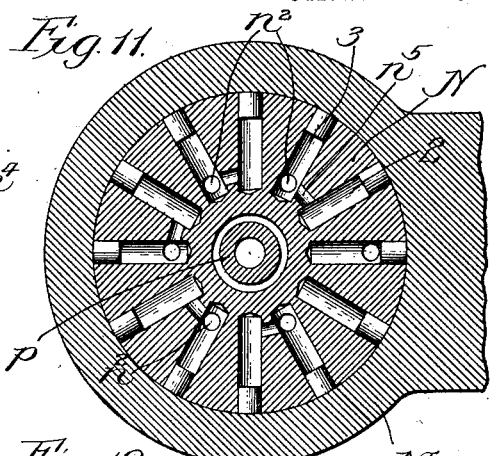
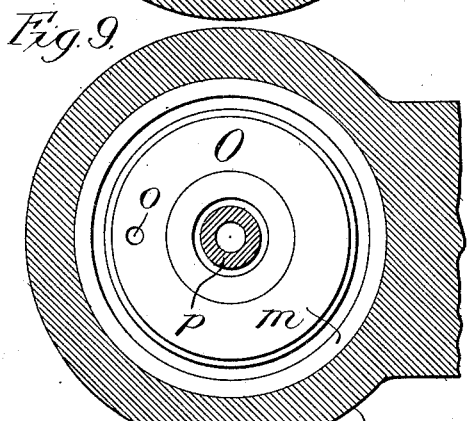
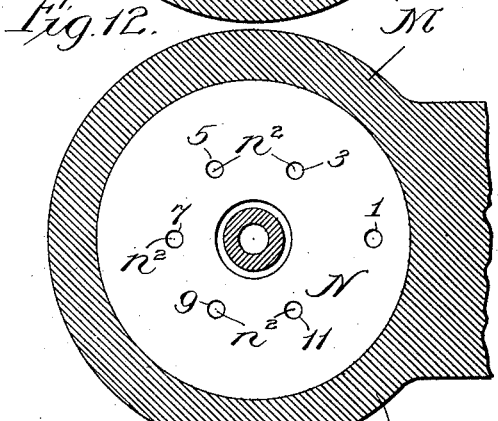
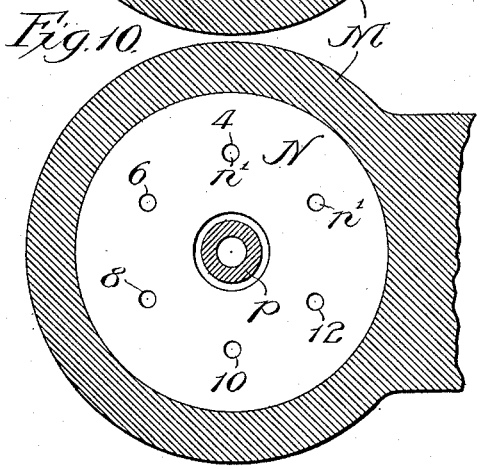
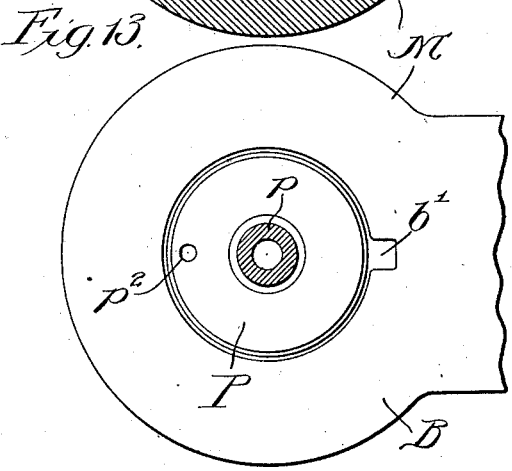
Witnesses:
John Enders
Chas. H. Buell
Inventor:
William A. Pendry
By Sheridan, Wilkinson & Scott,
Attys.

UNITED STATES PATENT OFFICE.

WILLIAM A. PENDRY, OF DETROIT, MICHIGAN.

APPARATUS FOR RETARDING THE RELEASE OF ENGINE-BRAKES.

1,006,497. Specification of Letters Patent. Patented Oct. 24, 1911.

Application filed September 7, 1909. Serial No. 516,396.

*To all whom it may concern:*

Be it known that I, WILLIAM A. PENDRY, a citizen of the United States, residing at Detroit, in the county of Wayne and State of Michigan, have invented certain new and useful Improvements in Apparatus for Retarding the Release of Engine-Brakes, of which the following is a specification.

My invention relates in general to automatic railway brakes, and more particularly to apparatus for retarding the release of the brakes on the locomotive and tender until after the brakes on the cars of the train have been released.

In the operation of the usual automatic compressed air railway brakes, after an application of the brakes, and it is desired to release the brakes, the train pipe pressure is increased, which releases the brakes first on the engine and tender and successively on the cars of the train, the brakes on the last car being the last released. When the train is standing on a down grade, this releasing operation is objectionable as the release of the brakes on the locomotive before the release of the brakes on the cars frequently results in the train being broken in two, owing to the strain exerted upon the couplings by the weight of the locomotive and tender after the brakes have been released thereon and before the brakes have been released on all of the cars of the train.

It has heretofore been proposed to remedy this objection by providing separate valve mechanism for releasing the locomotive and tender brakes, so that the brakes may be released in the usual way on the cars of the train, and subsequently by the operation of the separate valve mechanism, the brakes on the locomotive and tender are released. Apparatus of this sort, however, renders it necessary for the engineer to operate two separate valves, in order to release the brakes on the train, and this is objectionable, not only because it complicates the brake mechanism but also because it adds to the already too numerous duties of the engineer.

The primary object of my invention is to provide mechanism which may be used in connection with the ordinary automatic railway brake systems, and which, when the brake apparatus is operated in the usual way for releasing the brakes, will retard the release of the locomotive and tender brakes until after the brakes have been released on the cars of the train.

A further object of my invention is to provide an attachment for retarding the release of brakes on a locomotive until after the brakes on the cars of a train have been released, which is capable of being adjusted to vary the retardation of the release of the locomotive brakes according to the length of the train.

A still further object of my invention is to provide mechanism for retarding the release of locomotive brakes which will be comparatively simple in construction, practical in use, and efficient in operation.

My invention will be more fully described hereinafter with reference to the accompanying drawings, in which the same is illustrated as embodied in a convenient and practical form, and in which—

Figure 1 is an elevational view; Fig. 2, an elevational view, looking from the right in Fig. 1; Fig. 3, a top plan view; Fig. 4, a bottom plan view; Fig. 5, a vertical central section on line 5, Fig. 3; Fig. 6, a cross sectional view on line 6, Fig. 5; Fig. 7, a cross sectional view on line 7, Fig. 5; and Figs. 8 to 13, inclusive, sectional views, taken on lines indicated on Fig. 5 by numerals corresponding to the numerals of these figures.

The same reference characters are used to designate the same parts in the several figures of the drawings.

Reference letter A indicates a valve chamber with which communicates a coupling C, adapted to be connected with the usual train pipe of an ordinary automatic compressed air brake system, preferably at a point adjacent the engineer's valve. At the other side of a transverse partition $a$, within the valve chamber A, there communicates a passage $d$ leading from a coupling D adapted to be connected with the train pipe leading to the locomotive and tender brake apparatus.

Extending through the partition $a$ is a cylindrical sleeve A', the lower end of which is provided with a circular valve seat $a'$, with which coöperates a valve $A^2$. The space above the valve $A^2$ communicates with a train pipe leading to the locomotive and tender brake apparatus, the top of such space being closed by a circular partition E having an outwardly projecting flange $e'$ resting against a shoulder formed in the surrounding wall of the chamber A. An exteriorly screw-threaded ring E' is located in vertical alinement with the ring E and retains the shoulder $e'$ thereon against the shoulder on the valve casing, the ring E being in screw-threaded engagement with the surrounding surface of the casing A. The ring E' is provided at its upper edge with an interiorly projecting annular flange $e^2$ having at its inner edge a circular valve seat. Located within the ring E' is a piston F. A plunger rod $F^2$ extends downwardly in concentric alinement with the piston F and projects through the partition E, a suitable stuffing box $e$ being provided in the partition around the rod $F^2$. A shoulder $f^2$ is formed around the rod $F^2$ immediately below the stuffing box $e$. The lower end of the rod $F^2$ rests against the upper surface of the valve $A^2$, but is disconnected therefrom. Projecting above the upper surface of the piston F is a screw-threaded stud $f'$ surrounded and engaged by a post F', which is provided with an outwardly projecting flange at its lower end overlying and retaining against the adjacent surface of the piston F suitable packing material which serves as a valve to engage the circular valve seat around the annular flange $e^2$.

The post F' is provided with a surrounding circular flange $f^3$, which fits within a guide cylinder $h^3$ located concentrically within and preferably formed integral with a cap H. A coil spring G is secured at its lower end $g$ to the post F' and at its upper end surrounds and is thereby secured to the stud G' swiveled on the lower end of a rod $g'$. The spring G and lower end G' of the rod are located within the surrounding cap H, which is secured at its lower exteriorly screw-threaded end $h$ within the upper end of the valve chamber A. The stem $g$ is prevented from rotating relatively to the surrounding cap H by means of vertical ribs $h'$ within the cap which engage notches in a disk surrounding the lower end G' of the rod, as clearly shown in Fig. 5. The rod $g'$ projects through a stuffing box located at the upper end of the cap H, $H^2$ indicating the stuffing and $h^2$ the gland of the stuffing box. The portion of the rod $g'$ which projects through the stuffing box has secured thereto a collar $G^2$, having in the outer surface thereof a groove $g^2$. A stud on the lower end of a lever $g^3$ extends into the groove $g^2$, the opposite end of such lever being fixed to a stub shaft $G^3$ journaled in the upper end of a plate $G^4$, the latter being secured to the cap H in any suitable manner, as by means of a split collar $g^4$. The plate $G^4$ is provided with a scale $g^5$ thereon with which coöperates a pointer $G^5$ secured to the stub shaft $G^3$.

Depending from the valve $A^2$ is a stem $a^4$ having secured to the lower end thereof a washer $a^5$. An annular disk $k$ loosely surrounds the rod $a^4$ and rests upon the washer $a^5$. A spring K surrounds the rod $a^4$ and is interposed between the disk $k$ and the under surface of the valve $A^2$. The disk $k$ normally rests upon a circular support K' having spaced feet $k'$ resting upon the head B which closes the lower end of the valve chamber A. The tension of the spring K is such that the valve $A^2$ will be normally held in the position shown in Fig. 5, in which a restricted feed groove $a^2$ permits equalization of pressure on the opposite side of the valve.

A piston valve L is located within a bushing $l$ extending downwardly within the valve cylinder head B, such piston valve being normally retained in the position shown in Fig. 5 by the light spring $L^4$ located beneath the valve and supported by a hollow cap $l^4$ engaging within an interiorly screw-threaded opening $b$ in the head B.

A cylinder chamber M is located adjacent and parallel to the valve chamber A, and is preferably formed in a single casting with the valve chamber. The valve chamber head B is extended to close the lower end of the chamber M. A plurality of annular disks N rests upon each other and are concentrically located in the chamber M, the lowest one of such disks resting upon the underlying surface of the head B. The several disks N are provided with radial chambers $n$, twelve of such chambers being provided in each disk and the corresponding chambers in the several disks being arranged in vertical alinement. The alining chambers in the several disks communicate by means of lower ports $n^2$, which register with the upper ports $n'$ in the underlying disks. The disks are clamped tightly together so as to be held against rotation by means of a lock ring $m$ exteriorly screw-threaded and engaging within the interiorly screw-threaded upper end of the chamber M. A cap M' is mounted upon the upper end of the chamber M and is secured thereto by an exteriorly screw-threaded flange $m'$ engaging the screw threads within the end of the chamber. A valve stem $o$ extends through a stuffing box carried by the cap M', $m^2$ indicating the stuffing therein and $M^2$ the gland. The lower end of the valve stem $o$ has formed thereon a disk valve O, which seats upon the upper surface of the top disk N and controls the openings leading from the alternate radial chambers in such disk. A port $o'$ extends through the valve O and is adapted to register with the opening leading from one of the alternate radial chambers in the top disk, in a manner to be more fully hereinafter described. Extending within and secured to the lower end of the stem $o$ is a hollow stem $p$, such hollow stem extending concentrically through the several superimposed disks N. The lower end of the hollow rod $p$ is exteriorly screw-threaded and is engaged by a collar P', between which and the under surface of a disk valve P is interposed a spring $p'$. The disk valve P is secured to rotate with the rod $p$, but to move axially thereon in any suitable manner, as by means of a stud $p^3$ extending from the rod $p$ and into a vertical slot in the depending flange on the disk valve. The valve P is provided with a port $p^2$ adapted to be brought successively into register with ports extending from alternate radial chambers in the lower disk N. The port $p^2$ communicates with the hollow interior of the rod $p$, the latter communicating at its upper end with a port $o^2$ leading through the stem $o$ to the space within the chamber M beneath the cap M'. The upper end of the valve stem $o$ is provided with a hand wheel O' having on its upper surface a dial R, with which coöperates a pointer $r$ projecting from and secured to the cap H in any suitable manner, as by means of a ring R' surrounding the cap and clamped thereon by a set screw $r'$.

The operation of my improved retarding valve mechanism is as follows: The parts are in the position shown in Fig. 5 when the brake apparatus is in the usual running condition,—that is, the auxiliary reservoirs communicate through the usual feeding ports with the train pipe, and the brake cylinders are connected with the atmosphere. Train pipe pressure passes to the chamber A below the valve $A^2$, and thence passes through the feeding groove $a^2$ to the space above the valve $A^2$, with which communicates a train pipe leading to the triple valves on the locomotives and tender brakes. The piston L is retained in the position shown by exposing the lower surface thereof to the train pipe pressure through the communicating passages D' and $d'$, the former of which leads from the train pipe coupling D. The annular groove in the piston L connects an atmospheric port $l^3$ with the port $l^2$, through the surrounding bushing $l$, and such port communicates with a passage $L^2$ formed in the casting of the valve chamber A and communicates through the restricted port $e^3$ with the space above the piston F. The under surface of the piston F is at all times in communication with the atmosphere through an exhaust port $e^4$. When the brakes are applied, the reduction in train pipe pressure results in the valve $A^2$ quickly opening, by reason of the excessive pressure above the same, thereby permitting the pipe leading to the locomotive and tender brakes to directly communicate with the train pipe chamber A, so that the pressure therein is reduced and the brakes applied co-incidentally with the application of the brakes on the cars of the train. After the brakes are applied, and it is desired to release them, the train pipe is directly connected with the main reservoir, so as to subject the triple valve pistons to an excessive train pipe pressure, and thereby move them into position to release the brakes. This excessive train pipe pressure passes to the space beneath the valve $A^2$ and instantly tightly seats such valve, thereby closing the feed groove $a^2$ past the same. The excessive train pipe pressure also forces the piston valve L downwardly, owing to the under surface of such valve being exposed through passages $d'$ and D' to the lower pressure in the branch locomotive train pipe. The port $l'$ is thereby uncovered, so that the increased train pipe pressure passes through the passage L' into the space B' in the head B below the valve P. The pressure then passes through the port $b'$ and overlying registering port leading into the first radial passage in the lowest disk N. The pressure then passes successively through the vertically alined radial passages in the superimposed disks until the top disk is reached. The pressure then passes through the passage $n^4$ to the second radial passage in the top disk, attention being directed to Fig. 8. If the position of the valve O is such that the port $o'$ therein registers with the port $n'$ leading upwardly from the second radial passage in the top disk, then the pressure passes to the space above the valve O, and thence, through the passage $o^3$, to the space within the cap H above the piston F. The portion of the piston F exposed through the circular opening through the flange $e^2$ is, therefore, subjected to the releasing train pipe pressure, and is quickly moved downwardly away from the valve seat around the opening through the flange $e^2$, thereby exposing the upper entire area of the piston F to the increased train pipe pressure. The piston F is then quickly moved downwardly and, depressing the plunger rod $F^2$, moves the valve $A^2$ away from its seat. The increased train pipe pressure then flows past the valve $A^2$ to the pipe leading to the triple valves on the locomotive and engine brakes, thereby releasing such brakes. When the brakes on the locomotive and tender have been released and the pressures on the opposite sides of the valve $A^2$ have equalized, the valve mechanism is returned to the condition shown in Fig. 5, by reason of the tension of the spring G lifting the piston F, at such time the upper surface of the piston F being exposed to atmospheric pressure through the passages $e^3$, $L^2$, port $l^2$, annular groove around the valve L, and exhaust port $l^3$. It will be understood that the valve L has at such time returned to its normal position, owing to the equalization of pressure through the restricted passage $d'$ with the train pipe pressure to which the upper surface of the valve is exposed, and the action of spring $L^4$. The equalization of pressure on opposite sides of the valve $A^2$ permits the tension of the spring K to return the valve A² to its running position and lifts the plunger rod F² until its shoulder $f^2$ engages the lower end of the packing box $e$.

It will be observed that in the above described operation the flow of the increased releasing train pipe pressure to the locomotive and tender brakes has been retarded by the restricted connected passageways through the first series of alined communicating chambers in the superimposed disks N. The retardation thus effected is sufficient when the train is composed of five cars or less, and the hand wheel O' then occupies the position shown in Fig. 3, in which the pointer $r$ registers with the numeral 5 on the dial.

When the train is composed of from five to ten cars the hand wheel O' is turned so that the pointer $r$ will register with the numeral 10 on the dial. This movement of the hand wheel moves the port $o'$ in the valve O out of register with the port $n'$ leading from the second vertically alined series of chambers, but rotates the valve P so that the port $p^2$ therein registers with the port $n^2$ leading from the bottom chamber of the second alined series of chambers. The increased train pipe pressure consequently passes downwardly through the second series of connected chambers and through the port $p^2$ to the hollow interior of the rod $p$, and thence through the port $o^2$ to the space above the piston F. This produces double the retardation and delays the release of the locomotive and tender brakes until the brakes on all of the cars have been released. Pressure to the space above the piston F is thereby retarded, and the release of the locomotive and tender brakes delayed until the brakes have been released on all of the cars of the train. This is accomplished by the valves O and P, the port $o'$ in the former of which registers with the ports $n'$ leading from alternate alined series of communicating chambers, while the port $p^2$ in the valve P registers only with ports $n^2$ leading from the intermediate alined communicating series of chambers.

The operation of my improved valve retarding mechanism may be varied according to the normal train pipe pressure, by adjusting the tension of the spring G so as to increase the tension of such spring when the normal train pipe pressure is greater than sixty pounds, and thereby adjust the operation of the valve mechanism to accord with the particular degree of the normal train pipe pressure. This is accomplished by rotating the screw-threaded rod $g'$ relatively to the surrounding screw threads in the cap H, and thereby vertically adjusting the cap to such a position that the pointer G will register with the numeral on the dial $g^5$ corresponding to the normal train pipe pressure.

From the foregoing description it will be observed that I have invented an improved valve mechanism which may be applied to the usual automatic compressed air brake system, and which retards the release of the locomotive and tender brakes until after the release of the train brakes, no other manually operated valve being necessary than the usual engineer's valve. It will also be observed that my improved retarding valve mechanism is capable of being readily adjusted so as to retard the release of the locomotive and tender brakes according to the length of the train, and is also capable of being adjusted to conform to different normal train pipe pressures.

It will, of course, be understood that various mechanical devices can be provided for securing the desired retardation of the flow of the increased releasing train pipe pressure, and that I do not wish to be understood as limiting myself to the particular specific structure herein illustrated and disclosed. I also wish to be understood as not limiting myself to any of the specific details of structure herein disclosed, but desire to cover any and all specific embodiments coming within the terms of my claims.

I claim:

1. The combination with an automatic air brake system comprising a train pipe communicating with an engineer's valve and through branch train pipes with brake applying apparatus on the cars and locomotive, of mechanism interposed in the branch leading from the train pipe to locomotive brake apparatus for retarding the release of the locomotive brakes.

2. The combination with an automatic air brake system comprising a train pipe communicating with an engineer's valve and with brake applying apparatus on the cars and locomotive, of mechanism interposed between the train pipe and locomotive brake apparatus for retarding the passage of air from the train pipe to the locomotive brake apparatus.

3. The combination with an automatic air brake system comprising a train pipe communicating with an engineer's valve and through branch train pipes with brake applying apparatus on the cars and locomotive, of mechanism in the branch train pipe leading to the locomotive for retarding the automatic release of the locomotive brakes when the engineer's valve is in release position until after the release of the brakes on the cars of the train.

4. The combination with an automatic air brake system comprising a train pipe communicating with an engineer's valve and with brake applying apparatus on the cars and locomotive, of mechanism interposed between the train pipe and locomotive brake apparatus for retarding the release of the locomotive brakes, and means for adjusting said mechanism according to the number of cars in the train.

5. The combination with an automatic air brake system comprising a train pipe communicating with an engineer's valve and with brake applying apparatus on the cars and locomotive, of mechanism interposed between the train pipe and locomotive brake apparatus for retarding the release of the locomotive brakes, means for adjusting said mechanism according to the number of cars in the train, and means for adjusting said mechanism according to the normal running train pipe pressure.

6. The combination with an automatic air brake system comprising a train pipe communicating with an engineer's valve and with brake applying apparatus on the cars and locomotive, of an intercepting valve between the train pipe and locomotive brake apparatus, means for opening said valve, a plurality of passageways leading to said opening means, and means for connecting said passageways in series with the train pipe during the release operation of the brake system.

7. The combination with an automatic air brake system comprising a train pipe communicating with an engineer's valve and with brake applying apparatus on the cars and locomotive, of an intercepting valve between the train pipe and locomotive brake apparatus, means for opening said vlave, a plurality of passageways leading to said opening means, and means for adjustably connecting one or more of said passages in series with the train pipe according to the number of cars in the train.

8. The combination with an automatic air brake system comprising a train pipe communicating with an engineer's valve and with brake applying apparatus on the cars and locomotive, of valve mechanism interposed between the train pipe and locomotive brake apparatus for retarding the release of the locomotive brakes comprising an intercepting valve between the train pipe and locomotive brake apparatus, a piston for opening said valve, a chamber within which said piston reciprocates, a restricted passageway leading to said piston chamber, and means for connecting said passageway with the train pipe during the release operation of the brake system.

9. The combination with an automatic air brake system comprising a train pipe communicating with an engineer's valve and with brake applying apparatus on the cars and locomotive, of valve mechanism interposed between the train pipe and locomotive brake apparatus for retarding the release of the locomotive brakes comprising a chamber with which the train pipe communicates, a chamber with which the locomotive brake apparatus communicates, an intercepting valve controlling the communication between said chambers, a piston for unseating said valve, a chamber in which said piston is located, and means for retarding the flow of air from said train pipe chamber to said piston chamber during the release operation of the brake system.

10. The combination with an automatic air brake system comprising a train pipe communicating with an engineer's valve and brake applying apparatus on the cars and locomotive, of valve mechanism interposed between the train pipe and locomotive brake apparatus for retarding the release of the locomotive brakes comprising a chamber with which the train pipe communicates, a chamber with which the locomotive brake apparatus communicates, an intercepting valve controlling the communication between said chambers, a piston for unseating said valve, a chamber in which said piston is located, a restricted passageway leading from said train pipe chamber to said piston chamber, and means for normally connecting said passageway and said piston chamber with an exhaust, and for disconnecting said passageway and piston chamber from the exhaust and connecting said passageway with the train pipe chamber during the release operation of the brake system.

11. The combination with an automatic air brake system comprising a train pipe communicating with an engineer's valve and with brake applying apparatus on the cars and locomotive, of valve mechanism interposed between the train pipe and locomotive brake apparatus for retarding the release of the locomotive brakes comprising a chamber with which the train pipe communicates, a chamber with which the locomotive brake apparatus communicates, an intercepting valve controlling the communication between said chambers, a spring for normally seating said valve, a piston, a plunger actuated by said piston to unseat said valve, a chamber in which said piston is located, a series of passageways connecting said train pipe chamber with said piston chamber, and means for adjustably connecting one or more of said passageways in series according to the number of cars in the train.

12. The combination with an automatic air brake system comprising a train pipe communicating with an engineer's valve and with brake applying apparatus on the cars and locomotive, of valve mechanism interposed between the train pipe and locomotive brake apparatus for retarding the release of the locomotive brakes comprising a chamber with which the train pipe communicates, a chamber with which the locomotive brake apparatus communicates, an intercepting valve controlling the communication between said chambers, a piston for unseating said valve, a chamber in which said piston is located, means for retarding the flow of air from said train pipe and chamber to said piston chamber during the release operation of the brake system, a spring for returning said piston to normal position, and means for adjusting the tension of said spring according to the normal running train pipe pressure.

In testimony whereof, I have subscribed my name.

WILLIAM A. PENDRY.

Witnesses:
GEO. L. WILKINSON,
ANNIE C. COURTENAY.

Copies of this patent may be obtained for five cents each, by addressing the "Commissioner of Patents, Washington, D. C."